July 22, 1958 C. C. ROE 2,844,804
CONTROL TRANSFORMER

Filed July 6, 1955 3 Sheets-Sheet 1

INVENTOR.
CHARLES C. ROE
BY
ATTORNEY

July 22, 1958  C. C. ROE  2,844,804
CONTROL TRANSFORMER

Filed July 6, 1955  3 Sheets-Sheet 2

*INVENTOR.*
CHARLES C. ROE
BY John F. Schmidt
ATTORNEY

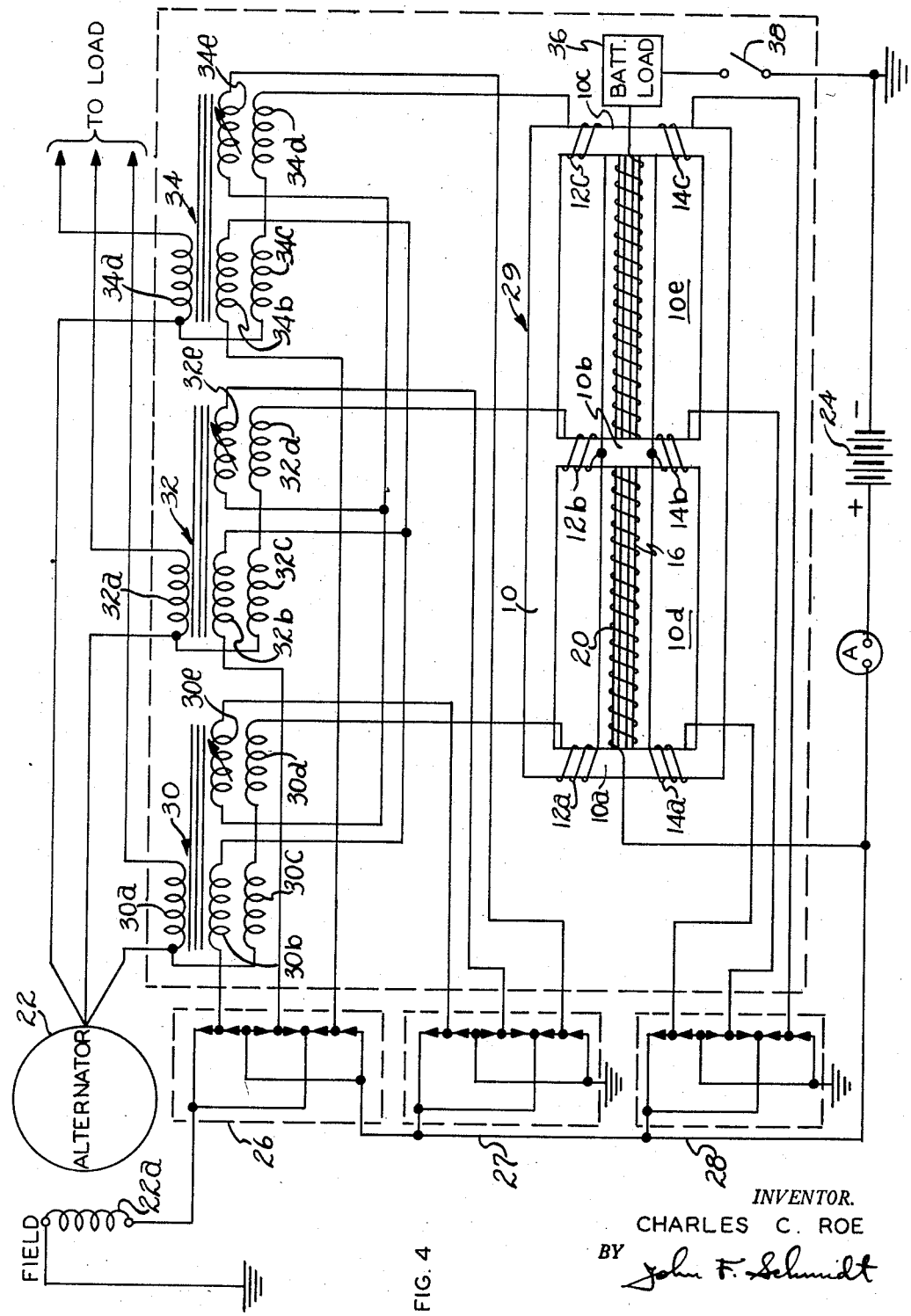

United States Patent Office 2,844,804
Patented July 22, 1958

2,844,804

CONTROL TRANSFORMER

Charles C. Roe, East Peoria, Ill., assignor to LeTourneau-Westinghouse Company, Peoria, Ill., a corporation of Illinois Application July 6, 1955, Serial No. 520,215

1 Claim. (Cl. 336—160)

My invention relates to an improved control transformer wherein the output power in a secondary circuit is controlled or regulated by a low power level D.-C. control current.

In accordance with the present invention a transformer is defined by a first core and a second core. The first core has a plurality of legs each defining flux paths and a pair of spaced coils on each leg encircling the flux path of that leg. The coils are spaced to straddle exposed side areas which respectively receive mating faces on the second core. The latter also has an energizing winding which gives rise to M. M. F. creating flux which passes through the second core in the region adjacent its faces in registration with the first core.

In use, the second core serves to define a flux bridge or shunt circuit between the legs of the first core. Flux traversing the bridge shunts the respective pair of windings on the legs. This gives rise to increased magnetic leakage between the windings. The magnitude of this magnetic leakage is determined by the magnitude of the flux passing between the legs of the first core through the second core. This magnitude is controlled by current flow through the second core since such current flow controllably saturates the second core.

The controlled leakage flux between the windings of the first core varies the leakage impedance of the secondary windings on the first core. This may be looked upon as varying the apparent internal impedance of the voltage source as seen from the secondary windings. When a rectifier, for example, is connected to these secondary windings the effect of varying the leakage impedance is to vary the D.-C. output current flow of the rectifier when feeding a constant resistance or a constant voltage load.

It is therefore a general object of the present invention to provide an improved regulating transformer using a flux bridge of controllable flux shunting effect.

Additionally, it is an object of the present invention to provide an improved regulating or control transformer wherein control is achieved by current flow in a control winding.

Further it is an object of the present invention to provide an improved regulating transformer in which the control is achieved through the use of a second core device having a separately saturable magnetic circuit substantially independent of the main core.

Further objects of the present invention include the provision of a simple control transformer; a transformer suitable for a variety or number of phases, voltages, and power capacities; and a transformer embodying features of construction, combination and arrangement rendering it suitable for mass production and practical commercial use.

The novel features which I believe to be characteristic of my invention are set forth with particularity in the appended claim. My invention itself, however, together with further objects and advantages will best be understood by reference to the following description taken in conjunction with the accompanying drawings in which:

Figure 4 is a circuit diagram of a complete regulating system incorporating the apparatus of the present invention.

Figure 1:
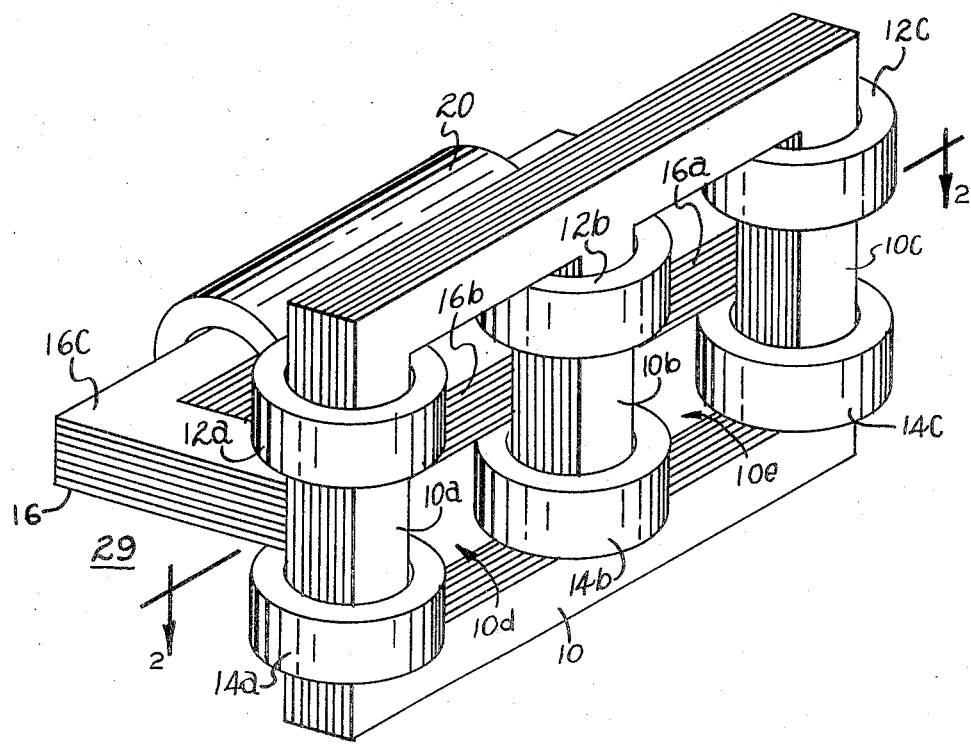
Figure 1 is a view in perspective of a three-phase transformer constructed in accordance with the present invention.
Figure 2:
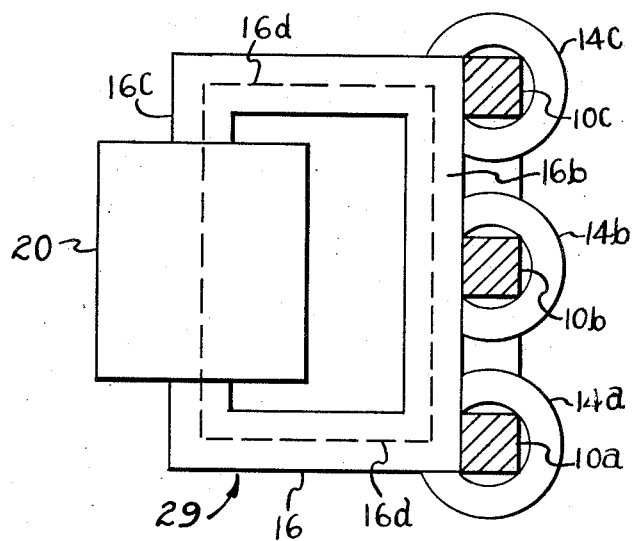
Figure 2 is a view through section 2—2, Figure 1 with parts in plan.

Referring now to Figures 1 and 2, the transformer 29 consists of a core 10 of generally rectangular conformation defining three parallel legs 10a, 10b and 10c and windows 10d and 10e. The legs 10a, 10b and 10c each receive a primary winding 12a, 12b and 12c. These primary windings are located adjacent the top of the respective transformer legs as shown and are of conventional construction. At its bottom end each leg receives a secondary winding 14a, 14b and 14c which is generally like the primary winding as shown.

It will be noted that the primary and secondary windings on each leg are in spaced position so that an exposed leg portion is provided between the windings of each respective pair. This forms a series of spaced exposed areas or faces on each side of the legs 10a, 10b and 10c.

A second core 16 of rectangular conformation is positioned against the legs 10a, 10b and 10c. Core 16 has a flat side or face 16a on the side abutting the legs 10a, 10b and 10c to permit a snug engagement between each of the legs and the side 16a. On its opposite side the core 16 carries a winding 20 as shown.

Figure 3:
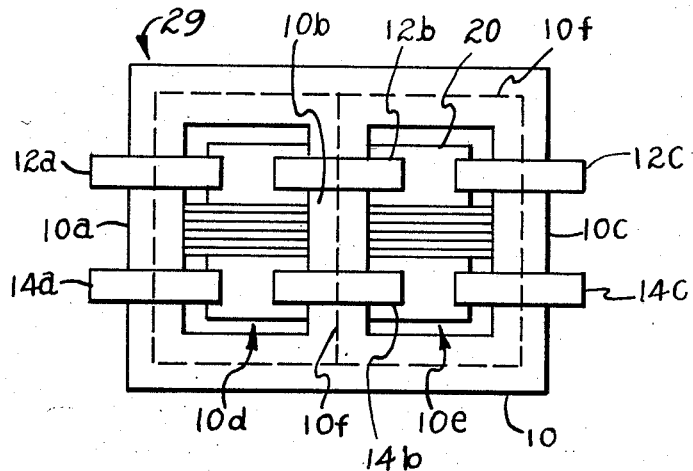
Figure 3 is a side elevational view of the transformer of Figures 1 and 2.

It will be noted that the cores 10 and 16 each have a major flux path. With respect to core 10 the major flux path is that through the legs 10a, 10b and 10c, respectively. This flux path, with its branch paths through the respective legs, is shown by the dotted lines 10f, Figure 3. In normal three phase operation the fluxes on the legs are displaced from each other by 120 degrees. With respect to the core 16, the flux path is around the core itself as shown by the dotted lines 16d of Figure 2. It will be noted that each of these major flux paths or circuits is confined to a single core and does not extend from one core to the other. However, there is also defined by the respective cores a shunt flux path which extends between the exposed faces of the legs 10a, 10b and 10c. This shunting flux path may be traced from the leg 10a to the adjacent portion of leg 16b of core 16 and through leg 16b to the exposed faces 10b and 10c of core 10. Finally, this path may be traced in the reverse direction from the exposed side of leg 10c or the exposed face of leg 10b back to the leg 10a. The effect of this path is to shunt a portion of the flux through the primary windings 12a, 12b and 12c so that such flux does not thread the secondary windings 14a, 14b and 14c.

In consequence, the core 16 serves to provide a leakage flux path between the windings 12a, 12b and 12c and the windings 14a, 14b and 14c, respectively.

The quantity of flux traversing the leakage path defined by core 16 is controlled by current flow in winding 20. When this current flow is absent, the core 16 saturates only to the extent associated with the leakage flux. In consequence, the leakage flux has a comparatively large value. However, as current is caused to flow in the coil 20 the core 16 is saturated by the resultant flux with the consequence that the ability of leg 16b to shunt flux between legs 10a, 10b and 10c is reduced in accord with the magnitude of the current flow. Thus, the current flow in coil 20 serves to vary the degree of saturation of core 16; its ability to shunt flux between legs 10a, 10b and 10c; and the leakage reactance between each of the windings 12a, 12b and 12c and the corresponding windings 14a, 14b and 14c.

In normal three-phase balanced operation the alternating flux through the outside leg 16c of the core 16 is of small amount. If the winding 20 is energized from a source of control current which is comparatively insensitive to voltage induced by such flux, it is unnecessary to take precautions with respect to it. However, if the flux does tend to react on the control circuit, a conducting sleeve (not shown), of copper, aluminum or similar material, may be interposed between winding 20 and the leg 16c.

Figure 4 shows a complete control circuit including the apparatus of the present invention. The circuit of this figure is shown and described in detail in the co-pending application of James I. Chandler and Charles C. Roe, Serial Number 514,184, filed June 9, 1955, and assigned to the same assignee as the present invention, this application being entitled, "Field Current Supply System for an Alternator." In brief, the alternator indicated at 22 has a field winding 22a which is energized from the D.-C. circuit including battery 24 and the D.-C. winding of rectifier 26. If these are in series circuit relationship the total D.-C. field current is determined by the total voltage developed by the battery and the rectifier 26. The rectifiers 28 and 27 serve to charge the battery 24 to compensate for the discharging current flow through the field. As to rectifier 28, the A.-C. energizing current is derived from the transformer indicated generally at 29 in the manner hereinafter described in detail. As to the rectifier 27, it receives alternating current in accord with the alternator A.-C. circuit conditions and serves to compensate for the battery discharge otherwise due to the action of the rectifier 26.

In use, the system of Figure 4 serves to energize the alternator field through the action of transformers 30, 32 and 34 as described in detail in the above-identified application. Each of these transformers has a primary winding 30a, 32a and 34a in series circuit relationship with the alternator three-phase load conductors. Each of these transformers also has a winding 30b, 32b and 34b which serves to energize the three-phase input terminals to the rectifier 26. The major function of these windings is to supply A.-C. voltage to the rectifier in accord with the alternator load current. Each transformer additionally has a secondary winding 30e, 32e and 34e serving to energize the rectifier 27. In addition to the foregoing windings, each of the transformers 30, 32 and 34 has a pair of series connected auxiliary primary windings identified as 30c, 30d; 32c, 32d; and 34c, 34d. The latter windings are connected in series with the Y-connected primary windings 12a, 12b and 12c of transformer 29.

The winding 20 in transformer 29, Figure 4, is connected in series with the D.-C. battery load 36 through the switch 38 and across the battery 24. Consequently as the current flow in load 36 increases, the direct current flow in winding 20 rises and the core 16 is increasingly saturated.

In operation, the circuit of Figure 4 serves to produce energizing voltage for rectifier 28 in accord with the magnitude of D.-C. battery load 36. Increased current flow in this load tends to saturate core 16 and thereby reduce the leakage flux between windings 12a, 12b and 12c and 14a, 14b and 14c, respectively. As that leakage flux is decreased, the induced voltage in the windings 14a, 14b and 14c is increased; thereby increasing the alternating input voltage to rectifier 28 and giving rise to increased battery charging current from that rectifier.

It is apparent that the construction of the present invention serves to permit control of the leakage impedance between the windings 12a, 12b and 12c and the windings 14a, 14b and 14c, respectively. This is accomplished by varying the quantity of shunt flux between the legs 10a, 10b and 10c due to the operation of the core 16. In practice, the winding 20 on the core 16 may be of relatively low power capacity inasmuch as it need only vary the degree of saturation of that core in the region where it shunts flux about the legs of core 10. In consequence, it is possible with the present invention to have a very large variation in power output of the transformer by the use of a control current having a very small low power level.

It will, of course, be understood by those skilled in the art that numerous modifications and alternative constructions may be made without departing from the true spirit and scope of the present invention. I, therefore, intend by the appended claim to cover all such modifications and alternative constructions falling within their true spirit and scope.

What I claim as new and desire to secure by Letters Patent of the United States is:

A control transformer comprising in combination: a first magnetic core defining a plurality of magnetic legs connected by magnetic portions to define flux paths through the legs; spaced coils on the legs respectively, and encircling said paths, the coils being in pairs, each coil of each pair being in spaced relationship with the other coil of such pair, the legs and coils being positioned to define aligned exposed side core areas straddled by the pairs of coils, respectively; a saturable magnetic core having a face seating against said areas to define a flux bridge between said areas to receive flux from the first core and hence define a leakage flux path between the coils straddling said areas, respectively, said last core having a leg in spaced relation to said face and defining a flux path through the portions of said saturable magnetic core adjacent said areas; and a winding on the last core located on said leg and in spaced relation to the first core to develop magnetomotive force operable to create flux threading the last core adjacent said face to generate saturating magnetic flux in response to current flow in said last winding and thereby control the quantity of magnetic flux shunting between said areas.

References Cited in the file of this patent

UNITED STATES PATENTS

| 2,703,391 | Gunderson | Mar. 1, 1955 |
|---|---|---|

FOREIGN PATENTS

| 707,221 | Germany | June 16, 1941 |
|---|---|---|
| 843,443 | Germany | July 7, 1952 |